United States Patent Office 3,444,088
Patented May 13, 1969

3,444,088
PROCESS FOR PREPARING HIGH DENSITY URANIUM DIOXIDE PARTICLES AND COMPOSITIONS
Frederick T. Fitch, Shaker Heights, Ohio, and Robert D. Shoup, Silver Spring, Md., assignors to W. R. Grace & Co., New York, N.Y., a corporation of Connecticut
No Drawing. Filed Feb. 24, 1967, Ser. No. 618,336
Int. Cl. G21c 19/42
U.S. Cl. 252—301.1          13 Claims

ABSTRACT OF THE DISCLOSURE

A process for preparing sintered, high density, uranium, dioxide particles from uranium trioxide aquasols by treating the aquasol with hydrogen peroxide or a polyhydric alcohol before drying or drying the uranium trioxide particles and rehydrating before reduction and sintering, or a combination of these process steps.

---

In the process of forming sintered uranium dioxide particles from uranium trioxide aquasols, a highly dense product is obtained if (a) the aquasol is treated with hydrogen peroxide or a polyhydric alcohol before drying, (b) the dried uranium trioxide particles are dehydrated and rehydrated before reduction and sintering or (c) a combination of both steps (a) and (b) is followed.

This invention relates to a process for preparing sintered uranium dioxide particles having an increased density and to the composition of matter formed thereby. In particular, the uranium dioxide particles of this invention are prepared by reducing and sintering uranium trioxide particles which have been prepared by an improved process.

In summary, the process of this invention is a method for preparing sintered uranium dioxide particles having an increased density by mixing a uranium trioxide aquasol with hydrogen peroxide or a water-soluble polyhydric alcohol, drying the aquasol to form uranium trioxide particles, reducing the particles, and sintering the particles at elevated temperatures in an inert or reducing atmosphere to form high density sintered particles of uranium dioxide. In an alternate process of this invention, uranium trioxide particles are formed by drying a uranium trioxide aquasol; the particles are heated at a temperature of from 15 to 350 C. until anhydrous uranium trioxide is formed; and the particles are soaked in water, redried, reduced, and sintered at elevated temperatures in an inert or reducing atmosphere. A further embodiment of the process of this invention combines both of the above processes, the uranium trioxide aquasol being pretreated with hydrogen peroxide or a water-soluble polyhydric alcohol, and the dried uranium trioxide particles being subjected to the heating, water-soaking, and redrying procedures. Preferably, the uranium trioxide aquasol is formed by heating ammonium diuranate at a temperature of from 250 to 350° C. until it is decomposed to anhydrous uranium trioxide, and mixing it with sufficient water to form a suspension containing up to 30 weight percent $UO_3$ to hydrate the uranium trioxide to uranium trioxide dihydrate. For the production of sintered microspheres of uranium dioxide, the particles are preferably formed by dispersing the uranium trioxide aquasol into droplets in a water-immiscible drying solvent having a solubility for water of from 1 to 30 weight percent and recovering partially dried, uranium trioxide microspheres therefrom. The compositions of this invention are those produced by the above processes.

Prior to this invention, it was known to prepare uranium dioxide by hydrogen reduction of $UO_3$ and $U_3O_8$ at elevated temperatures as disclosed in Patent Nos. 2,955,912 and 3,179,491. Sintered products formed by this process, however, did not have the high density desired for forming nuclear fuel elements by vibratory compaction and other similar techniques. The reactivity of uranium dioxide solids with hydrochloric acid has also been previously known. In Patent No. 3,192,010, uranium trioxide from which uranium dioxide was later formed by hydrogen reduction was soaked in water and subsequently dehydrated prior to the reduction step to form a product highly reactive on hydrofluorination. This technique, however, was not known to have any benefits in the production of highly dense, sintered uranium dioxide particles by heating the uranium dioxide particle at sintering temperatures.

It is an object of this invention to provide an economical process for obtaining uranium dioxide particles from uranium trioxide, which particles have increased density. It is another object of this invention to provide sintered uranium dioxide particles having a density sufficiently high to make them suitable for forming nuclear fuel elements by vibratory compaction and similar techniques.

In general, this invention relates to a process for preparing uranium dioxide particles from a uranium trioxide aquasol by drying the aquasol to form uranium trioxide particles, reducing the particles to uranium dioxide, and sintering the particles at elevated temperatures to form highly dense uranium dioxide particles.

Uranium trioxide aquasols can be prepared by peptization of an alkaline precipitated ammonium diuranate followed by replacement of the ammonium ions with hydrogen ions by electrodialysis or ion exchange.

Uranium trioxide sols prepared from ammonium diuranate as described in our copending application Ser. No. 623,227 filed Mar. 15, 1967 are particularly suitable for use in the process of this invention. This process comprises preparing a colloidal uranium trioxide by decomposing ammonium diuranate to anhydrous uranium trioxide by heating at a temperature of from about 250 to 350° C., mixing the anhydrous uranium trioxide with sufficient water to provide a concentration of up to 30 weight percent $UO_3$ in the mixture, and hydrating the anhydrous uranium trioxide to form an aquasol of colloidal uranium trioxide hydrate particles.

In one embodiment of the process of this invention, the uranium trioxide aquasol is pretreated with hydrogen peroxide or a water-soluble polyhydric alcohol. The uranium trioxide aquasol can be mixed with from 0.5 to 10.0 mole percent and preferably from 1 to 5 mole percent hydrogen peroxide, based on the moles of the $UO_3$ in the sol. The uranium trioxide aquasol can also be treated with from 1 to 10 volume percent of a water-soluble polyhydric alcohol. Suitable polyhydric alcohols include ethylene glycol, glycerol, diethylene glycol, and the like.

The uranium trioxide aquasol is then dried to form uranium trioxide particles. Any suitable drying techniques can be employed. For example, the aquasol can be tray-dried by heating at a temperature below the boiling point of the sol to remove free water and then heating at a temperature of from 150 to 350° C. and preferably from 200 to 250° C. in air to remove bound water. The dried uranium trioxide layer formed can then be broken into small pieces, if not already broken due to internal drying stresses.

For the production of uranium dioxide microspheres, the uranium trioxide aquasol is preferably dried by dispersing it into droplets in a water immiscible drying solvent having a solubility for water of from 1 to 30 weight percent, and recovering partially dried, solid uranium trioxide microspheres from the solvent as described in application Ser. No. 329,981 filed Dec. 12, 1963. In this process, the uranium trioxide aquasol is introduced as droplets into the top of a countercurrently flowing stream of dehydrating solvent passing up through a column. As the droplets fall through the column, they are dehydrated, and the dehydrated microspheres are collected from the bottom of the column. The microspheres can be continuously removed, separated from the solvent, and finally dried before sintering.

The column apparatus comprises a tall column with a conical bottom into which the microspheres settle. The dehydrating solvent is introduced into the bottom of the column and is removed at the top thereof. The aquasol can be introduced into the top of the column to form sol droplets by several techniques. For example, a small tube or needle have an inner diameter within the range of 0.15 to 0.6 millimeter can be used to introduce the suspension into the solvent to produce the preferred particles. Preferably, the needle is surrounded by a larger capillary tube through which solvent is passed concurrently, and the suspension is introduced concurrently with this stream of solvent. As an alternate technique the sol can be dispersed in a suitable solvent to form an emulsion containing droplets having a uniform size, and the emulsion can be introduced into the column through an appropriate inlet. The dehydrated microspheres are removed from the conical collecting section at the bottom of the column.

The choice of dehydrating solvents for this system is very important. The solvents giving the best results are the higher alcohols which have the desired solubility for water. The solvents must be inert, free from objectionable physical properties such as emulsifying tendencies, for example, and must have a density sufficiently low to permit settling the microspheres. The solvents selected must have saturation concentrations with water within a certain range permitting adjustment of drying conditions. A solubility for water of from about 1 to 30 weight percent has provided satisfactory results. Examples of suitable solvents include butanol, hexanol, ethyl-hexanol, and ethyl-butanol. Solvents with water-solubilities which are too high may be recircualted from the solvent recovery systems still retaining a predetermined amount of water, whereby the effective water solubility is decreased. For example, butanol, which has a hot solubility for water of about 28 weight percent, is nearly saturated with water when introduced into the column. In contrast, ethylhexanol, which has a 4 to 6 weight percent hot solubility for water, is circulated to the column in nearly anhydrous form. Hexanol, with a 10 to 11 weight percent hot solubility for water is used with a water content of 3 to 6 percent. The temperature of the dehydrating solvent entering the column generally ranges from about 60 to 120° C. while that leaving the top of the column is generally from about 10 to 40° C. cooler.

The suspension droplets are dried to a final water content of less than 50 weight percent and preferably less than 25 weight percent in the column. The microspheres can then be dried by heating at temperatures of from 40° C. up to 110° C.

The dried uranium trioxide particles are then reduced at a temperature of from 450 to 900° C. and preferably from 500 to 600° C. in a reducing atmosphere containing a reducing gas such as hydrogen, ammonia, carbon monoxide and the like to form uranium dioxide particles. The uranium dioxide particles are then densified at a temperature of from 1200 to less than 2176° C. and preferably from 1400 to 1800° C. in an inert or reducing gas such as the rare gases, nitrogen, hydrogen, and the like to form uranium dioxide particles with increased density.

In another embodiment of the process of this invention, there is no pretreatment of the uranium trioxide aquasols with hydrogen peroxide or a polyhydric alcohol. Instead, the uranium trioxide particles are heated at a temperature of from 150 to 350° C. and preferably from 200 to 250° C. until anhydrous uranium trioxide is formed, soaked in water, and redried prior to the reduction and sintering steps. This technique, similar ot the pretreatment of the aquasol with hydrogen peroxide or a polyhydric alcohol, increases the density of the sintered uranium dioxide particles. Repetition of the heating, water-soaking, and redrying steps of this embodiment further increases the density of the sintered uranium dioxide particles.

In the preferred embodiment of the process of this invention, the uranium trioxide aquasol is treated with hydrogen peroxide or a polyhydric alcohol, as described above, and the uranium trioxide particles are also heated unitl anhydrous uranium trioxide is formed, soaked in water, and redried prior to reduction and sintering as described above.

The uranium dioxide particles produced by the process of this invention are characterized in having a greatly increased density. Whereas microspheres formed by the solvent dehydration processes had a density of about 80 percent of theoretical values without pretreatment of the aquasol, treatment of the uranium trioxide aquasol with hydrogen peroxide or a polyhydric alcohols effects a final uranium dioxide particle density of from 94 to 95 percent of theoretical. The dehydrating, water-soaking, and redrying treament of the dried uranium trioxide particles effects an increase in the sintered densities of the uranium dioxide particle products from 94 percent (produced with the above pretreatment of the uranium trioxide aquasol) and 80 percent (without this pretreatment) to 96 to 98 percent of the theoretical density. As can be seen, the compositions of this invention comprise uranium dioxide particles produced by the above methods and are characterized as having a greatly increased density approaching theoretical density.

This invention is further illustrated by the following specific but non-limiting examples.

EXAMPLE 1

This example describes producing uranium trioxide aquasols from ammonium diuranate.

Ammonium diuranate was precipitated from a uranyl chloride solution by adding an excess of an ammonium hydroxide solution with stirring. The ammonium diuranate precipitate was filtered from the reaction mixture and washed free of salt impurities with deionized water.

The washed filter cake was heated in an oven at 250° C. for four hours during which time the ammonium diuranate decomposed to anhydrous uranium trioxide. Fifty grams of the anhydrous uranium trioxide was mixed with 250 ml. of distilled water, and the mixture was subjected to strong shear in a Waring Blendor. This vigorous mechanical mixing was performed intermittently for from 5 to 10 minutes during each hour for a total of 6 hours. A uniform yellow uranium trioxide dihydrate sol was produced.

The sol had a slight tendency to settle over a 24 hour period but was readily dispersed. The hydrated uranium trioxide aquasol product contained approximately 10 weight percent $UO_3$, and had a pH of 5.0 and a specific conductance of $2.4 \times 10^4$ mho/cm. at 25° C.

This procedure was repeated to form other uranium trioxide hydrate sols from anhydrous uranium trioxide produced by heating ammonium diuranate at temperatures ranging from 250 to 350° C. for at least 4 hours. Ammonium diuranate precipitated with ammonia from uranyl fluoride and uranyl nitrate solutions were also used. Good sols were produced having pH values ranging from 4.5 to 5.3 and specific conductances ranging from $1.9 \times 10^{-4}$ to $8.1 \times 10^{-4}$ mho/cm.

EXAMPLE 2

This example shows the characteristics of uranium dioxide microspheres formed without the aquasol pretreatment or dried particle treatment employed in the process of this invention.

Microspheres with a size range of from 180 to 520 microns were prepared from a 9 weight percent uranium trioxide sol obtained by the procedure described in Example 1. These microspheres were formed by means of the column microsphere forming techniques disclosed in application Ser. No. 364,931, filed May 5, 1964. The sol had a pH of 5.2 and a specific conductance of $3.1 \times 10^4$ mho/cm. The column conditions were as follows:

|  | Solvent temperatures, °C. |
| --- | --- |
| To needle | 40 |
| To column | 100 |
| From column | 73 |
| In distillation pot | 108 |

The micropheres were separated from the hexanol solvent, washed in acetone, and vacuum dried using a cycle which consisted of holding periods of 1.5 hours each at 40°, 60°, 80°, 100° and 120° C. Spherical uranium trioxide handled in this manner was found to have a green density of 1.25 g./cc. These spheres were reduced and sintered to form uranium dioxide which exhibited a density of 8.64 g./cc. or about 79% of the theoretical value. The sintering cycle consisted of heating for 3 hours at 500° C. in hydrogen, raising the temperature over a one hour period of 1450° C. in argon, and heating for 2 hours at 1450° C. in argon.

Polished sections of the sintered uranium dioxide spheres revealed well formed dense bodies, but with some cracks and internal porosities which contributed to density reduction. This example is typical of the sintered densities (75 to 80% of theoretical) obtained with uranium dioxide spheres at sintering temperatures up to 1500° C. without pretreatment of the sol or the dehydrating, soaking, and redrying treatment of the uranium trioxide particles.

EXAMPLE 3

This example shows the characteristics of uranium dioxide particles formed from uranium trioxide aquasols by the tray-drying technique of particle formation but without pretreatment of the uranium trioxide aquasols or treatments of the uranium trioxide particles as in the process of this invention.

A uranium trioxide aquasol prepared by the procedure of Example 1 was placed in glass trays and dried in an oven at 90 to 100° C. The dried uranium trioxide layer was from ⅛ to ¼ inch in thickness and had broken into small pieces due to internal drying stresses. These irregular particles were observed to have green density of 2.1 g./cc. After reduction and sintering as described in Example 2, uranium dioxide particles were formed having a density 8.4 g./cc. or 78% of theoretical value.

In another test, the same uranium trioxide aquasol after treatment with ion exchange resins to increase the pH from 5.0 to 6.4 and decrease the specific conductance from $1.96 \times 10^{-4}$ to $8.48 \times 10^{-6}$ mho/cm. was dried, reduced and sintered as described above.

This material had a green density of 2.30 g./cc. and sintered to uranium dioxide with a density of 9.86 g./cc. or 90% of theoretical.

In general, tray-dried colloidal uranium trioxide could be sintered to 80 to 90% of the theoretical uranium dioxide density. These uranium dioxide bodies contained cracks and porosity due to the non-uniform shrinkage. Even though these straight forward drying techniques exhibit good potential for producing dense uranium dioxide, they cannot be adequately controlled to yield the very high density uranium dioxide required for such operations as vibratory compaction.

EXAMPLE 4

This example shows the effect on the final density of sintered uranium dioxide particles produced by treating the uranium trioxide aquasol with hydrogen peroxide.

A uranium trioxide aquasol prepared by the method of Example 1 was mixed with one ml. of hydrogen peroxide per 200 ml., the sol concentration being 10 wt. percent solids. Uranium trioxide microspheres were prepared from the hydrogen peroxide treated sol as described in Example 2. The uranium trioxide microspheres were heated in hydrogen for one hour at 300° C. and 3 hours at 500° C., and were heated up to 1500° C. in argon over a 2 hour period, and sintered at 1500° C. in argon for 2 hours. The green density of the microspheres prior to sintering was 1.01 g./cc., and the density of the sintered uranium dioxide microspheres was 10.31 g./cc. or 94% of theoretical density.

Polished sections of the sintered uranium dioxide microspheres obtained from the sols treated with hydrogen peroxide showed a marked decrease in internal porosity and cracks.

EXAMPLE 5

This example shows the effect upon the final density of sintered uranium dioxide particles produced by treating a uranium trioxide aquasol with a polyhydric alcohol.

A 200 ml. portion of a uranium trioxide aquasol having a concentration 10 wt. percent $UO_3$ was mixed with 4 ml. of ethylene glycol. Uranium trioxide microspheres were prepared from the treated sol as described in Example 4. The green microspheres of uranium trioxide prepared from this sol exhibited a density of 0.93 g./cc., and the sintered uranium dioxide microspheres had a density of 10.33 g./cc. or 94% of the theoretical density.

The addition of small quantities of ethylene glycol to the uranium trioxide aquasol was found to increase sintered uranium dioxide density in a manner similar to treatment with hydrogen peroxide. A similar effect can be obtained with other water-soluble polyhydric alcohols such as glycerol, diethylene glycol, and the like. Polished sections of the sintered uranium dioxide microspheres obtained from the sols treated with ethylene glycol showed a marked decrease in internal porosity and cracks.

EXAMPLE 6

This example shows the effect upon sintered densities of uranium dioxide microspheres caused by treating the green, dried uranium trioxide microspheres with the heating-rehydration steps of this invention.

Green uranium dioxide microspheres were prepared by the procedure described in Example 2. The heating-rehydration treatment consisted of heating the microspheres in air at 225° C. for 3 hours, soaking the microspheres in water at room temperature for at least 6 hours, vacuum drying as described in the Example 2, and again heating at 225° C. for 3 hours. The uranium trioxide microspheres showed an increase in green density from 1.03 g./cc. to 3.18 g./cc. as a result of this treatment. The microspheres were heated in hydrogen for 3 hours at 500° C., heated up for 2 hours to 1500° C. in argon, and were heated for 2 hours at 1500° C. in argon. The sintered uranium dioxide spheres had a density of 10.60 g./cc. or 96.7% of theoretical density.

The heating-rehydration treatment described above was repeated a second time on a portion of these uranium trioxide microspheres prior to sintering. An additional density increase of the green microspheres from 3.18 g./cc. to 3.83 g./cc. was observed. The density of the sintered uranium dioxide microspheres was increased by this second heating-rehydration step to 10.76 g./cc. or 98.2% of theoretical density.

EXAMPLE 7

In this example the effects of the heating-rehydrating treatment upon the final sintered density of uranium dioxide microspheres formed from uranium trioxide aquasols which had been treated with either hydrogen peroxide or a polyhydric alcohol are shown.

Uranium trioxide microspheres produced by the procedures of Examples 4 and 5 were subjected to a heating-rehydrating treatment as described in Example 6 prior to the sintering step.

The uranium trioxide mircospheres obtained from the uranium trioxide sol with hydrogen peroxide addition originally had a green density of 1.01 g./cc. when dried at 120° C. and a sintered density of 10.31 g./cc. or 94% of theoretical density. With the heating-dehydrating treatment described in Example 6, a green density of 3.0 g./cc. after drying at 225° C. and a sintered uranium dioxide particle density of 10.74 g./cc. or 98% of theoretical density was observed.

Microspheres obtained from uranium trioxide aquasols treated with ethylene glycol (the unsintered spheres produced in Example 5) originally had a green density of 0.93 g./cc. after drying at 120° C. and a sintered density of 10.33 g./cc. or 94.2% of theoretical density. After the heating-rehydrating treatment described in Example 6 was applied to the unsintered microspheres, the green density increased to 2.73 g./cc. after heating at 225° C., and the sintered uranium dioxide particles had a density of 10.68 g./cc. or 97.5% of theoretical density.

EXAMPLE 8

In this example the effect of the process of this invention upon the sintered density of uranium dioxide particles formed from tray-dried colloidal uranium trioxide produced by the procedure of Example 3 is shown. The uranium trioxide aquasol was treated with hydrogen peroxide, and the dried uranium trioxide particles were subjected to the drying-rehydration treatment.

A 200 ml. portion of a uranium trioxide aquasol having a concentration of 10 wt. percent $UO_3$ was mixed with 2 ml. of a 30% hydrogen peroxide solution and tray-dried at 90° C. The tray-dried particles had a green density of 2.26 g./cc. The particles were subject to a single heating-rehydration treatment as described in Example 6, and the green density of the particles was increased to 3.23 g./cc. The uranium dioxide particles were reduced and sintered as described in Example 3, and the sintered uranium dioxide particles had a density of 10.56 g./cc. or 96.3% of the theoretical density.

Obviously many modifications and variations of the invention as hereinabove set forth can be made without departing from the essence and scope thereof, and only such limitations should be applied as are indicated in the claims.

The invention claimed is:

1. A process for preparing sintered uranium dioxide particles having an increased density comprising the steps of
  (a) mixing a uranium trioxide aquasol with from 0.5 to 10 mole percent hydrogen peroxide, based on the moles of $UO_3$ in the sol, or from 1 to 10 volume percent of the water-soluble polyhydric alcohol, based on the weight of $UO_3$ in the aquasol,
  (b) drying the aquasol to form uranium trioxide particles,
  (c) reducing the uranium trioxide particles at a temperature of from 450 to 900° C. in a reducing gas to form uranium dioxide particles, and
  (d) sintering the uranium dioxide particles at a temperature of from 1200 to less than 2176° C. in an inert gas or reducing gas to form uranium dioxide particles having an increased density.

2. The process of claim 1 wherein the uranium trioxide aquasol is treated with hydrogen peroxide.

3. The process of claim 1 wherein the uranium trioxide aquasol is treated with ethylene glycol.

4. The process of claim 1 wherein the aquasol is dried by dispersing it into droplets in a water-immiscible drying solvent having solubility for water of from 1 to 30 weight percent, and recovering partially dried, solid uranium trioxide microspheres.

5. The process of claim 1 wherein the uranium trioxide aquasol is formed from ammonium diuranate.

6. The process of claim 1 wherein the uranium trioxide particles are reduced at a temperature of from 500 to 600° C., and the uranium dioxide particles are sintered at a temperature of from 1400 to 1800° C.

7. The process of claim 1 wherein the dried uranium trioxide particles are heated at temperatures of from 150 to 350° C. until anhydrous uranium trioxide is formed, soaked in water, and redried prior to sintering.

8. The process of claim 7 wherein the heating-rehydrating, water soaking, and redrying steps are repeated at least once prior to sintering.

9. A process for preparing sintered uranium dioxide particles having an increased density comprising the steps of
  (a) drying a uranium trioxide aquasol to form uranium trioxide particles,
  (b) heating the particles at a temperature of from 150 to 350° C. until anhydrous uranium trioxide is formed,
  (c) soaking the particles in water,
  (d) redrying the particles,
  (e) reducing the uranium trioxide particles at a temperature of from 450 to 900° C. in a reducing gas to form uranium dioxide particles, and
  (f) sintering the uranium dioxide particles at a temperature of from 1200 to less than 2176° C. in an inert gas or reducing gas to form uranium dioxide particles having an increased density.

10. The process of claim 9 wherein the uranium trioxide particles are reduced at a temperature of from 500 to 600° C., and the uranium dioxide particles are sintered at a temperature of from 1400 to 1800° C.

11. The process of claim 9 wherein the uranium trioxide aquasol is formed from ammonium diuranate.

12. The process of claim 11 wherein the dehydrating, water-soaking, and redrying steps are repeated at least once prior to sintering.

13. The process of claim 9 wherein the aquasol is dried by dispersing it into droplets in a water-immiscible drying solvent having a solubility for water of from 1 to 30 weight percent, and recovering partially dried, solid uranium trioxide microspheres.

References Cited

UNITED STATES PATENTS

| | | | |
|---|---|---|---|
| 3,037,840 | 6/1962 | Gregory et al. | 23—354 |
| 3,189,555 | 6/1965 | Smith et al. | 252—301.1 |
| 3,211,518 | 10/1965 | Acker et al. | 252—301.1 X |
| 3,281,373 | 10/1966 | Smith et al. | 252—301.1 |
| 3,313,602 | 4/1967 | Smith et al. | 252—301.1 |
| 3,326,813 | 6/1967 | Fitch et al. | 252—301.1 |
| 3,331,785 | 7/1967 | Fitch et al. | 252—301.1 |

BENJAMIN R. PADGETT, Primary Examiner.

MELVIN J. SCOLNICK, Assistant Examiner.

U.S. Cl. X.R.

23—355; 264—.5